(12) United States Patent
Hagiwara et al.

(10) Patent No.: US 8,078,042 B2
(45) Date of Patent: Dec. 13, 2011

(54) VIBRATION-PROOF LENS UNIT AND IMAGE CAPTURING APPARATUS

(75) Inventors: Kosuke Hagiwara, Tokyo (JP); Eiji Mikamoto, Kanagawa (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 12/693,694

(22) Filed: Jan. 26, 2010

(65) Prior Publication Data
US 2010/0195996 A1 Aug. 5, 2010

(30) Foreign Application Priority Data
Jan. 30, 2009 (JP) .................. 2009-020365

(51) Int. Cl.
*G03B 17/00* (2006.01)
*H04N 5/228* (2006.01)
*G02B 27/64* (2006.01)

(52) U.S. Cl. ............... 396/55; 348/208.11; 359/557
(58) Field of Classification Search ........... 396/52, 396/55, 85; 348/208.99, 208.11; 359/557
See application file for complete search history.

(56) References Cited

U.S. PATENT DOCUMENTS

| | | |
|---|---|---|
| 2005/0270379 A1 | 12/2005 | Seo |
| 2006/0176373 A1 | 8/2006 | Ito et al. |
| 2007/0183766 A1* | 8/2007 | Miyamori et al. .......... 396/55 |
| 2009/0252484 A1 | 10/2009 | Hasuda |

FOREIGN PATENT DOCUMENTS

| | | |
|---|---|---|
| JP | A-2007-241254 | 9/2007 |
| WO | WO 2007/055356 A1 | 5/2007 |
| WO | WO 2008/155906 A1 | 12/2008 |

OTHER PUBLICATIONS

European Search Report issued in corresponding European Application No. 10151827.2, dated Jun. 22, 2010.

\* cited by examiner

*Primary Examiner* — Rochelle-Ann J Blackman
(74) *Attorney, Agent, or Firm* — Oliff & Berridge, PLC

(57) ABSTRACT

Goal: Providing a vibration-proof lens that can restrict an increase in thickness in the direction of the optical axis.
Means: A vibration-proof lens unit comprising a lens holder that holds a vibration-proof lens; a support that supports the lens holder in a manner to be movable within a plane orthogonal to an optical axis of the vibration-proof lens; an engaging section that engages the lens holder with the support such that the lens holder can move (i) in a rotational direction around an axis line parallel to the optical axis of the vibration-proof lens and (ii) in a direction of a rotational radius orthogonal to the axis line; a rotational driving unit that moves the lens holder in the rotational direction; and a linear driving unit that moves the lens holder in the direction of the rotational radius.

9 Claims, 10 Drawing Sheets

VIBRATION-PROOF LENS UNIT AND IMAGE CAPTURING APPARATUS

BACKGROUND

1. Technical Field

The present application claims priority from a Japanese Patent Application No. 2009-20365 filed on Jan. 30, 2009, the contents of which are incorporated herein by reference. The present invention relates to a vibration-proof lens unit and an image capturing apparatus.

2. Related Art

A known vibration-proof lens unit includes a linear movement stage for holding a vibration-proof lens and moving the vibration-proof lens linearly, a rotation stage for supporting the linear movement stage and moving the linear stage in a rotational direction, and a fixed stage that is fixed to a lens barrel to support the rotation stage, as shown in, for example, Japanese Patent Application Publication No. 2007-241254. This vibration-proof lens unit is provided with separate stages for linear movement and for rotational movement, and therefore the thickness of the overall unit in the direction of the optical axis increases.

SUMMARY

Therefore, it is an object of an aspect of the innovations herein to provide a vibration-proof lens unit that can minimize the increase in thickness in the direction of the optical axis.

To solve this problem, a first aspect of the present invention provides a vibration-proof lens unit (100) comprising a len's holder (140) that holds a vibration-proof lens (126, 128); a support (142) that supports the lens holder in a manner to be movable within a plane orthogonal to an optical axis (L2) of the vibration-proof lens; an engaging section (180) that engages the lens holder with the support such that the lens holder can move (i) in a rotational direction around an axis line parallel to the optical axis of the vibration-proof lens and (ii) in a direction of a rotational radius orthogonal to the axis line; a rotational driving unit (202) that moves the lens holder in the rotational direction; and a linear driving unit (204) that moves the lens holder in the direction of the rotational radius.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

DESCRIPTION OF EXEMPLARY EMBODIMENTS

Hereinafter, an embodiment of the present invention will be described. The embodiment does not limit the invention according to the claims, and all the combinations of the features described in the embodiments are not necessarily essential to means provided by aspects of the invention.

Figure 1:
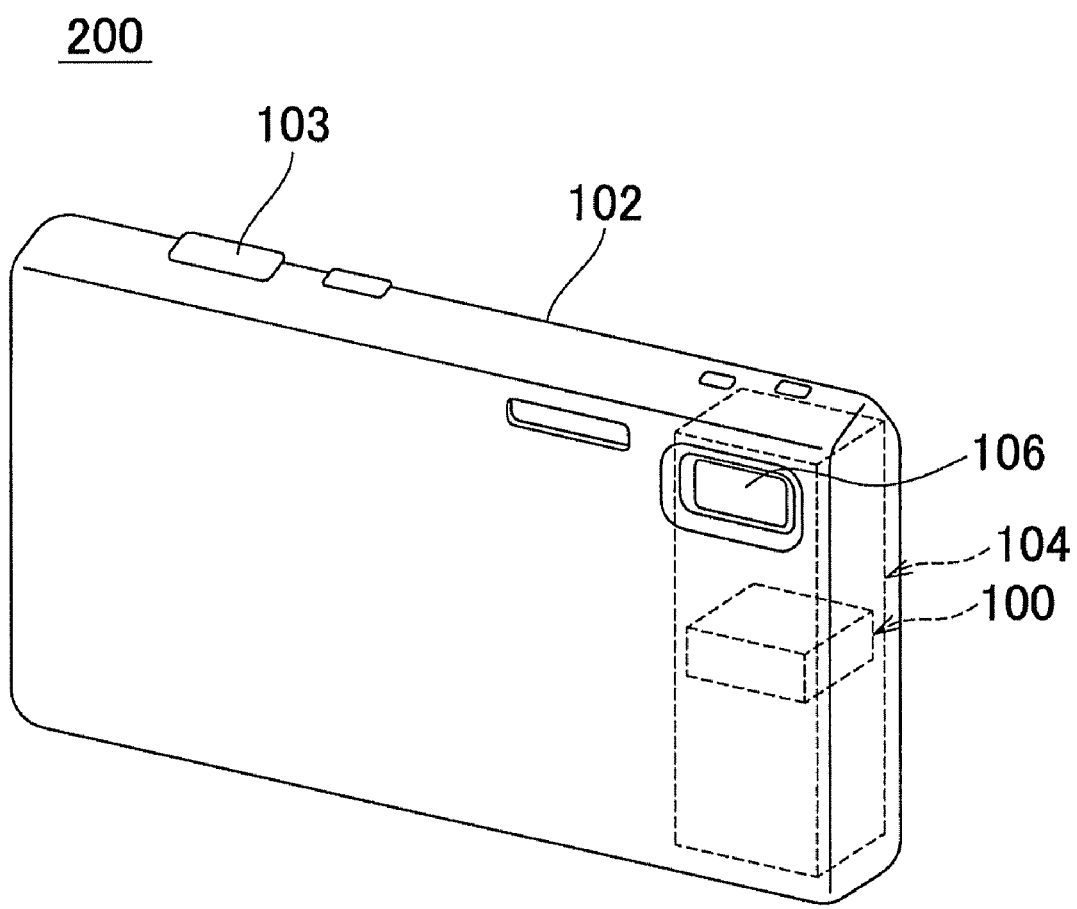
FIG. 1 is a perspective view of a digital camera 200 provided with a vibration-proof lens unit 100 according to an embodiment of the present invention.

FIG. 1 is a perspective view of a digital camera 200 provided with a vibration-proof lens unit 100 according to an embodiment of the present invention. As shown in FIG. 1, the digital camera 200 has a case 102 that is formed to be thin from a front surface facing a subject to a back surface facing a photographer. The case 102 houses a lens barrel 104 in the right side thereof, where "right" here is defined as the right side of FIG. 1, and this lens barrel 104 includes the vibration-proof lens unit 100. The lens barrel 104 is arranged to have its length extend up and down in the case 102, and an upper portion of the lens barrel 104 is provided with a lens 106 whose optical axis is oriented toward the subject.

The digital camera 200 includes a hand vibration sensor, such as an angular velocity sensor, and a drive control section that controls driving of the vibration-proof lens unit 100 according to the detection result of the hand vibration sensor. In other words, when hand vibration occurs during image capturing with the digital camera 200, the drive control section controls the driving of the vibration-proof lens unit according to an output signal of the hand vibration sensor, thereby decreasing blur in the image captured by an image capturing element.

A release switch 103 is provided on the top of the case 102. In the following description, the up and down direction of the case 102 in a state where the release switch 103 is positioned on top of the case 102 is referred to as the "vertical" direction, and the direction to the left and right of the case 102 in this state as seen from the subject side is referred to as "crosswise."

Figure 2:
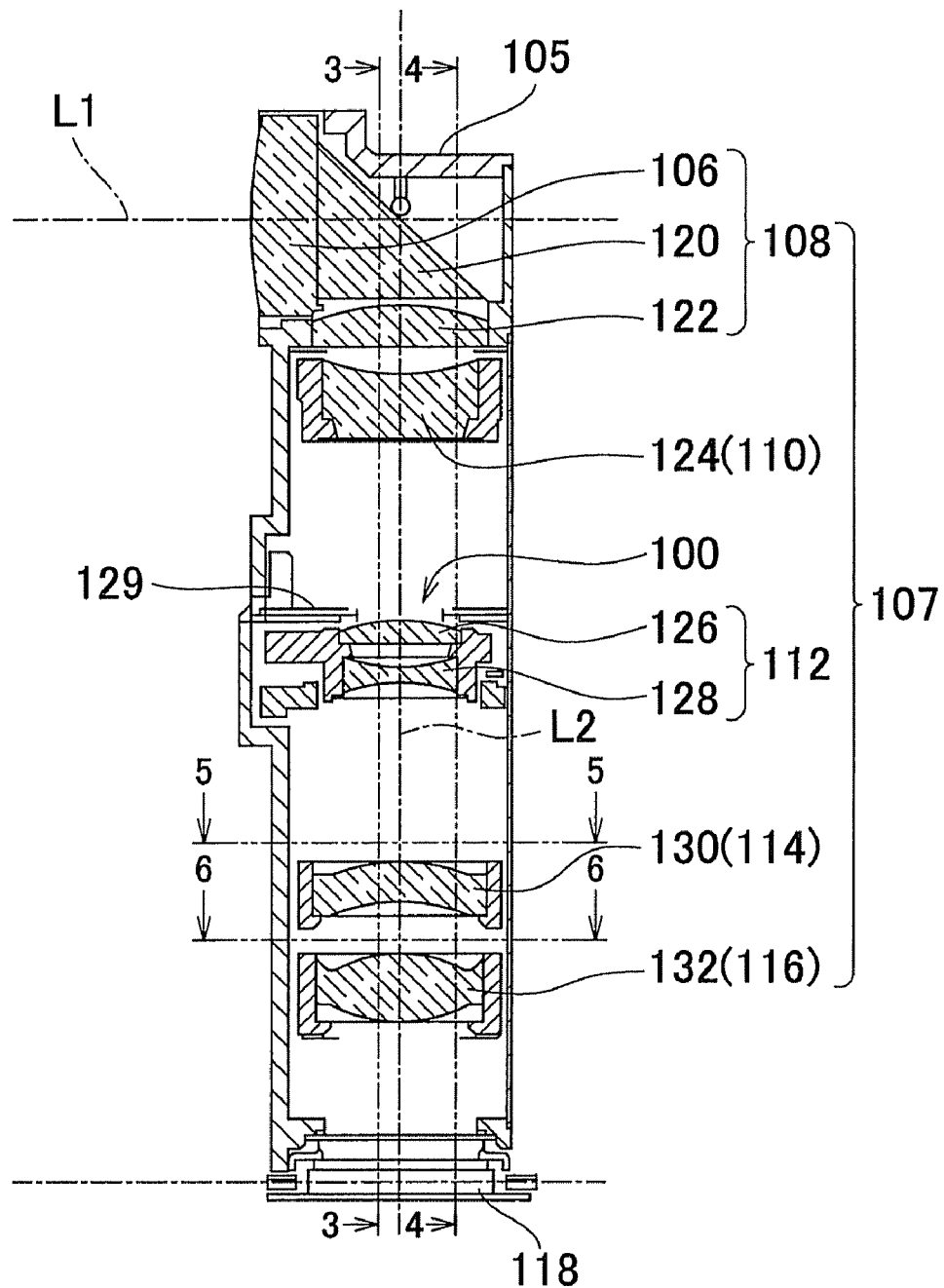
FIG. 2 is a cross-sectional view as seen from the side of the lens barrel 104.

FIG. 2 is a cross-sectional view as seen from the side of the lens barrel 104. As shown in FIG. 2, the lens barrel 104 is provided with a cylinder 105 whose length extends in the vertical direction in the case 102 and an image capturing optical system 107 arranged within the cylinder 105. The image capturing optical system 107 includes a first lens group 108 that contains the lens 106, a second lens group 110, a third lens group 112 serving as a vibration-proof lens group, a fourth lens group 114, and a fifth lens group 116. The image capturing optical system 107 focuses an image of the subject on the image capturing element 118.

The first lens group 108 includes the lens 106, a prism 120, and a lens 122. The prism 120 is a reflective component that bends the optical axis L1 downward at a right angle, and the lens 122 has an optical axis that matches the optical axis L2 bent by the prism 120.

The second lens group 110 is provided with a lens 124 that can move along the optical axis L2. The third lens group 112 is provided with vibration-proof lenses 126 and 128 that can move within a plane orthogonal to the optical axis L2. A shutter unit 129 is provided between the second lens group 110 and the third lens group 112. The shutter unit 129 has a shutter and a diaphragm. The fourth lens group 114 and the fifth lens group 116 respectively include lenses 130 and 132 that can move along the optical axis L2.

Here, the lenses 122 and 124, the vibration-proof lenses 126 and 128, and the lenses 130 and 132 are arranged in the stated order along the optical axis L2 bent downward by the prism 120. Only the lens 106 is arranged along the optical axis L1 that is not yet bent by the prism 120, and the optical path L1 is significantly shorter than the optical path L2. Therefore, the widening caused by the lens barrel 104 in the direction of the thickness of the case 102 can be restricted, and an increase in the thickness of the case 102 can be prevented.

Figure 3:
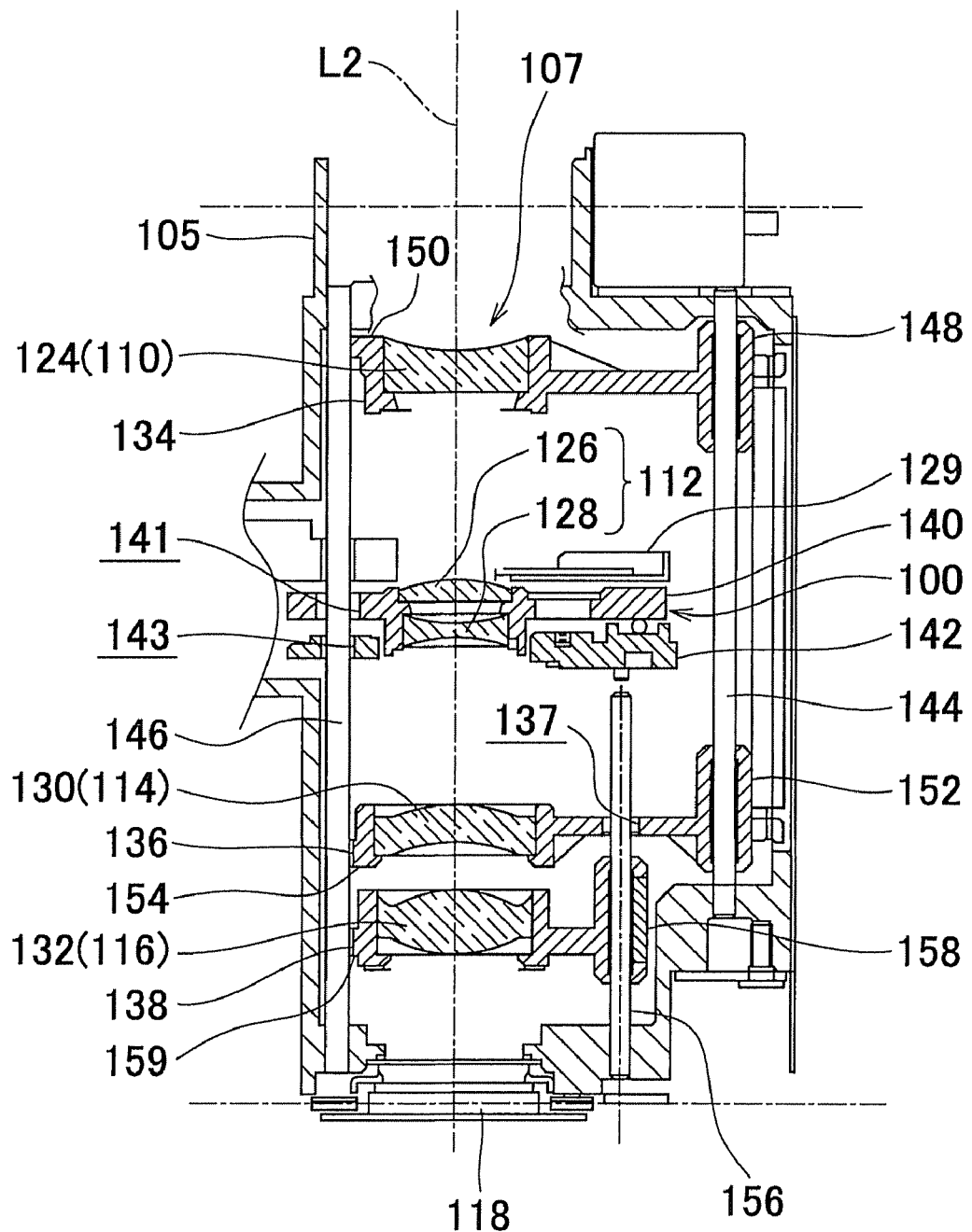
FIG. 3 is a cross-sectional view taken along the line 3-3 of FIG. 2.

FIG. 3 is a cross-sectional view taken along the line 3-3 of FIG. 2. As shown in FIG. 3, the lens barrel 104 includes a lens holding frame 134 that holds the second lens group 110, a lens holding frame 136 that holds the fourth lens group 114, and a lens holding frame 138 that holds the fifth lens group 116. The vibration-proof lens unit 100 includes a lens holding frame 140 that holds the third lens group 112 and a support frame 142 that holds the lens holding frame 140. The support frame 142 is fixed to the cylinder 105.

The cylinder 105 has a pair of guide bars 144 and 146 on the left and right that are arranged parallel to the optical axis L2. The axial ends of the guide bar 144 are respectively fixed to an upper right and a lower right portion of the cylinder 105. The axial ends of the guide bar 146 are respectively fixed to an upper left and a lower left portion of the cylinder 105.

The lens holding frame 134 is joined with the guide bar 144 and a bearing 148 in which is formed a circular hole into which the guide bar 144 is slidably inserted. The lens holding frame 134 is provided with a rotation stopping section 150 in which is formed a long hole into which the guide bar 146 is slidably inserted. In other words, the lens holding frame 134 is guided by the guide bars 144 and 146 along the optical axis L2 while being oriented in a plane orthogonal to the optical axis L2.

The lens holding frame 136 is joined with the guide bar 144 and a bearing 152 in which is formed a circular hole into which the guide bar 144 is slidably inserted. The lens holding frame 136 is provided with a rotation stopping section 154 in which is formed a long hole into which the guide bar 146 is slidably inserted. In other words, the lens holding frame 136 is guided by the guide bars 144 and 146 along the optical axis L2 while being oriented in a plane orthogonal to the optical axis L2.

A guide bar 156 is arranged between the lens holding frame 138 and the guide bar 144, parallel to the optical axis L2. The guide bar 156 stands on the bottom of the cylinder 105.

The lens holding frame 138 is joined with the guide bar 156 and a bearing 158 in which is formed a circular hole into which the guide bar 156 is slidably inserted. The lens holding frame 138 is provided with a rotation stopping section 159 in which is formed a long hole into which the guide bar 146 is slidably inserted. In other words, the lens holding frame 138 is guided by the guide bars 156 and 146 along the optical axis L2 while being oriented in a plane orthogonal to the optical axis L2.

A through-hole 137 is formed in the lens holding frame 136 between the optical axis L2 and the bearing 152, and the guide bar 156 passes through this through-hole 137. The through-hole 137 has a diameter greater than that of the guide bar 156. Therefore, the lens holding frame 136 can move along the optical axis L2 even though the guide bar 156 extends into a range in which the lens holding frame 136 moves.

The lens holding frame 140 that holds the vibration-proof lenses 126 and 128 and the frame support frame 142 that supports the lens holding frame 140 have through-holes 141 and 143 formed therein through which the guide bar 146 passes. The through-holes 141 and 143 each have a diameter greater than that of the guide bar 146, and a gap is formed between (i) the walls of the through-holes 141 and 143 and (ii) the guide bar 146.

Here, the through-hole 141 has a greater diameter than the through-hole 143, and so the gap between the wall of the through-hole 141 and the guide bar 146 is larger than the gap between the wall of the through-hole 143 and the guide bar 146. As a result, the lens holding frame 140 can move in a plane orthogonal to the optical axis L2, even though the guide bar 146 extends vertically through the range in which the lens holding frame 140 can be placed.

Figure 4:
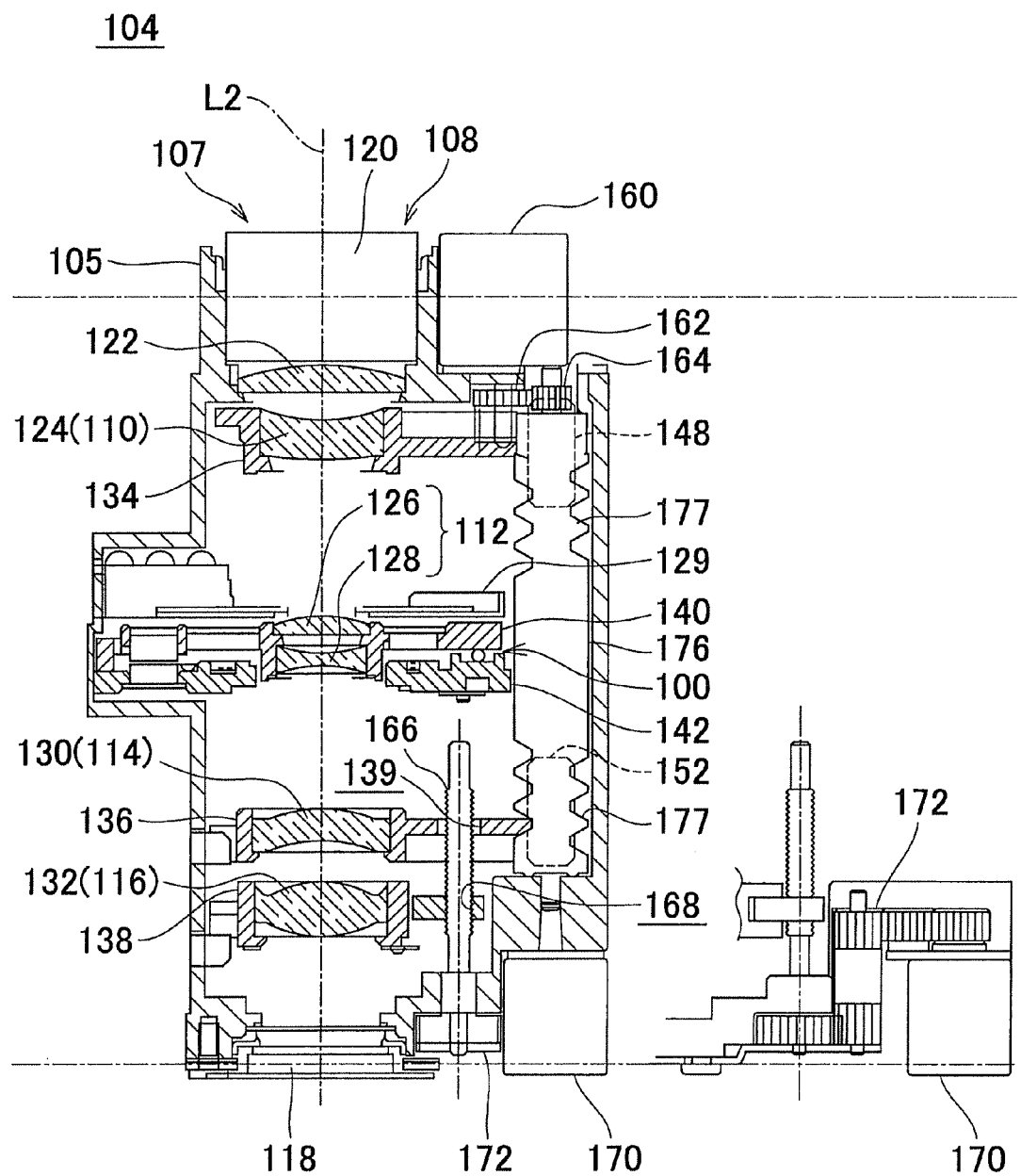
FIG. 4 is a cross-sectional view taken along the line 4-4 of FIG. 2.

FIG. 4 is a cross-sectional view taken along the line 4-4 of FIG. 2. The view of FIG. 4 is further toward the back of the case 102 than the cross-sectional view along the line 3-3. As shown in FIG. 4, a cam shaft 176 is arranged parallel to the optical axis L2 on the right side in the cylinder 105. The axial ends of the cam shaft 176 are supported on upper right and lower right portions of the cylinder 105 in a manner to be rotatable.

A motor 160 is arranged on top of the cylinder 105. A gear 162 is mounted on a rotation axle of the motor 160. A gear 164 that engages with the gear 162 is formed on top of the cam shaft 176. Therefore, the cam shaft 176 rotates by receiving the drive force of the motor 160 via the gears 162 and 164.

A pair of cam sections 177 are formed on upper and lower portions of the cam shaft 176. The cam sections 177 have spiral grooves that spiral axially. The bearing 148, which is joined with the lens holding frame 134, has an engaging section that engages with the upper cam section 177. The bearing 152, which is joined with the lens holding frame 136, has an engaging section that engages with the lower cam section 177. When the cam shaft 176 is rotated by the drive force of the motor 160, the lens holding frames 134 and 136 are guided by the guide bars 144 and 146 to move along the optical axis L2.

A lead screw 166 is arranged between the lens holding frame 138 and the cam shaft 176 parallel to the optical axis L2. The lead screw 166 stands on the bottom of the cylinder 105 in a manner to be rotatable. A thread component 168 that engages the lead screw 166 is provided on the lens holding frame 138.

A motor 170 is provided on the bottom of the cylinder 105. The motor 170 and the lead screw 166 are connected by a gear train 172, and the lead screw 166 rotates according to the drive force of the motor 170 applied via the gear train 172.

A through-hole 139 is formed in the lens holding frame 136 between the optical axis L2 and the bearing 152, and the lead screw 166 passes through this through-hole 139. The through-hole 139 has a diameter greater than that of the lead screw 166. Therefore, the lens holding frame 136 can move along the optical axis L2 even though the lead screw 166 extends into a range in which the lens holding frame 136 moves.

Figure 5:
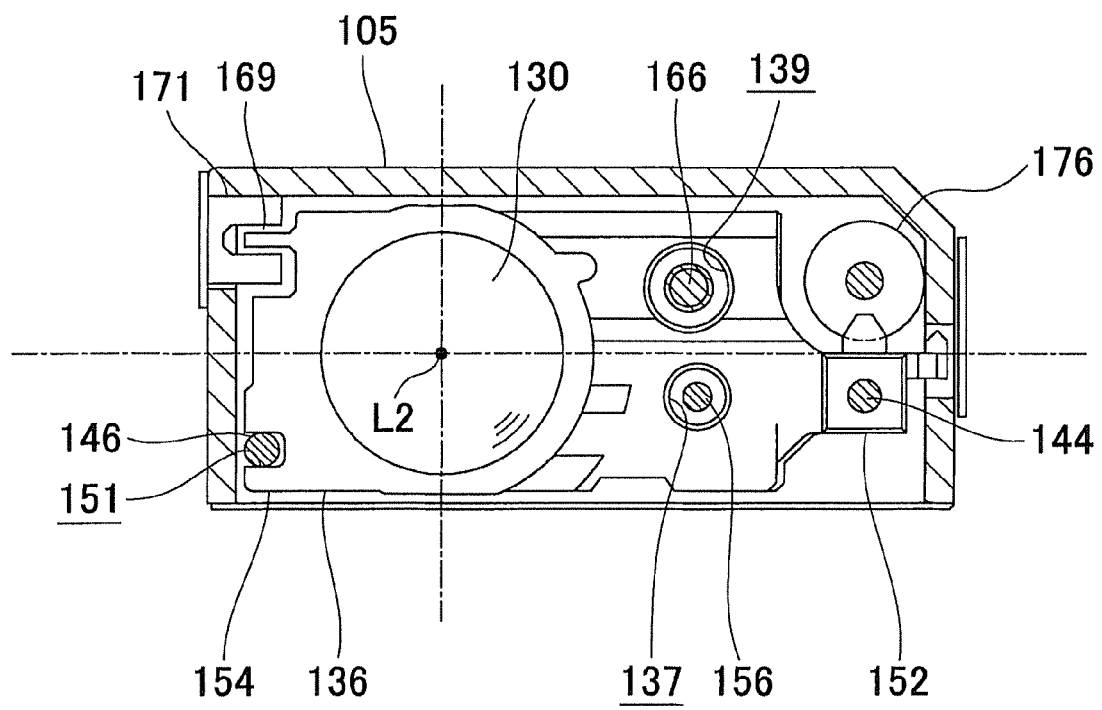
FIG. 5 is a cross-sectional view taken along the line 5-5 of FIG. 2.

FIG. 5 is a cross-sectional view taken along the line 5-5 of FIG. 2. As shown in FIG. 5, the cross-sectional shape as viewed from a radial direction of the cylinder 105 is a rectangle with a crosswise length, and contains the rectangular lens holding frame 136 whose length is also crosswise.

The rotation stopping section 154 is provided on a front left portion of the lens holding frame 136. The guide bar 146 is inserted into the long hole 151 of the rotation stopping section 154. The bearing 152 is provided on a front right portion of the lens holding frame 136. The guide bar 144 is inserted into the bearing 152.

An actuator 169 is provided on a back left portion of the lens holding frame 136. The actuator 169 is a board that protrudes leftward. A photo sensor 171 is provided to the cylinder 105 facing the actuator 169. The photo sensor 171 is a passing detection sensor that outputs a detection signal when the optical path is blocked by the actuator 169.

The through-holes 137 and 139 are provided in front and back positions on the lens holding frame 136 between the optical axis L2 and the bearing 152. As described above, the guide bar 156 is inserted into the through-hole 137 and the lead screw 166 is inserted into the through-hole 139.

Figure 6:
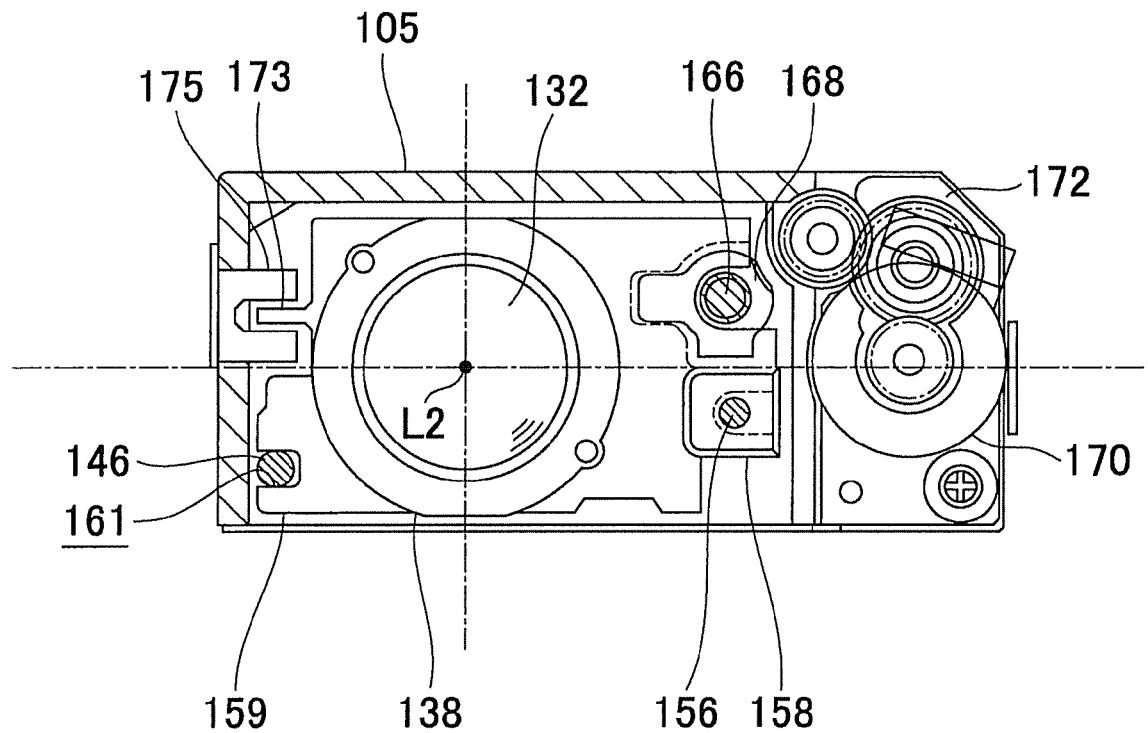
FIG. 6 is a cross-sectional view taken along the line 6-6 of FIG. 2.

FIG. 6 is a cross-sectional view taken along the line 6-6 of FIG. 2. As shown in FIG. 6, the lens holding frame 138 is shaped as a rectangle with a crosswise length, and is provided within the cylinder 105. The rotation stopping section 159 is formed on a front left portion of the lens holding frame 138. The guide bar 146 is inserted into the long hole 161 of the rotation stopping section 159.

The bearing 158 is formed on a front right portion of the lens holding frame 138. The guide bar 156 is inserted into the bearing 158. The thread component 168 is formed on a back right portion of the lens holding frame 138. The lead screw 166 engages with the thread component 168.

An actuator 173 is provided on a back left portion of the lens holding frame 138. The actuator 173 is a board that protrudes leftward. A photo sensor 175 is provided to the cylinder 105 facing the actuator 173. The photo sensor 175 is a passing detection sensor that outputs a detection signal when the optical path is blocked by the actuator 173.

Figure 7:
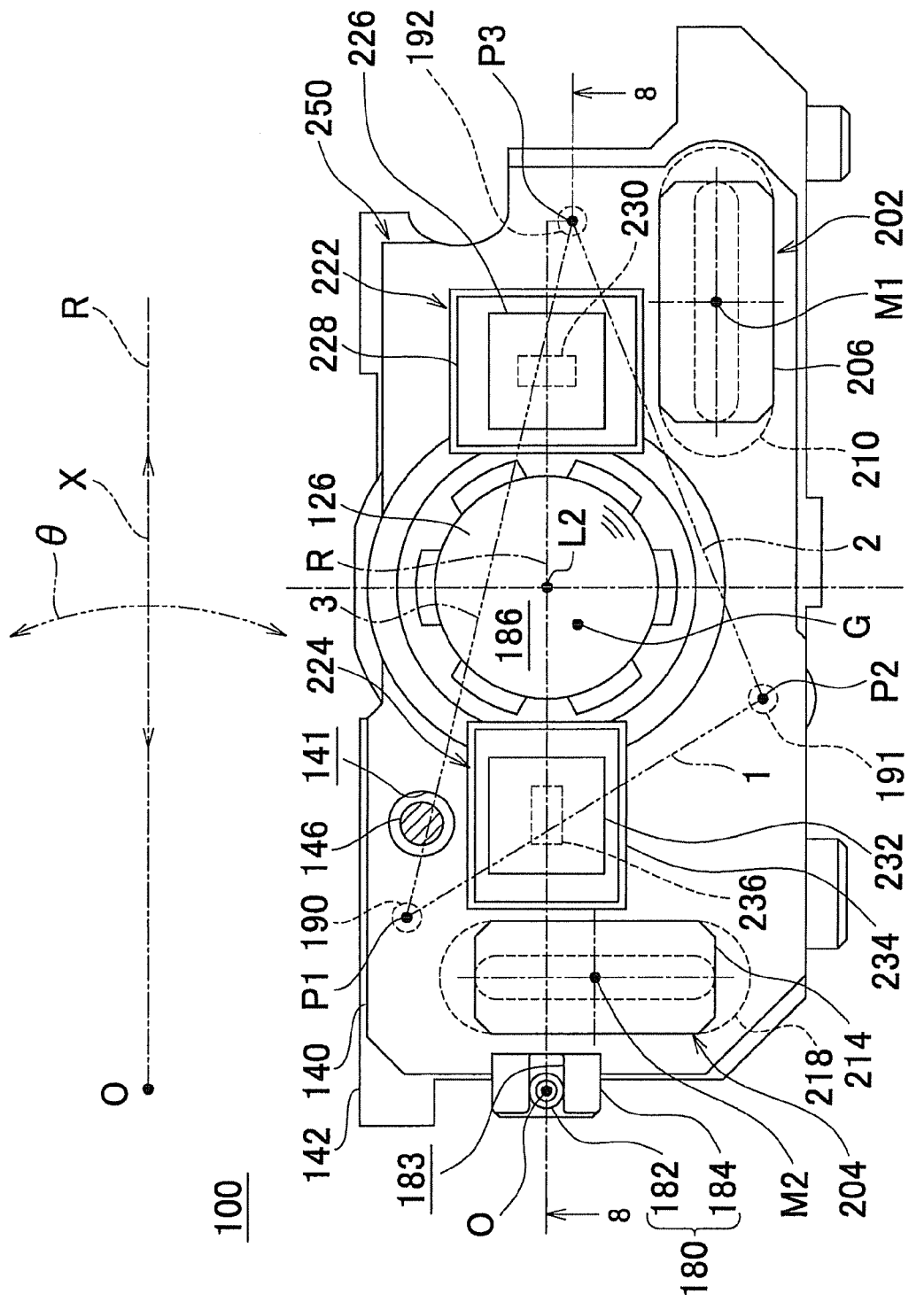
FIG. 7 is a planar view of the vibration-proof lens unit 100.
Figure 8:
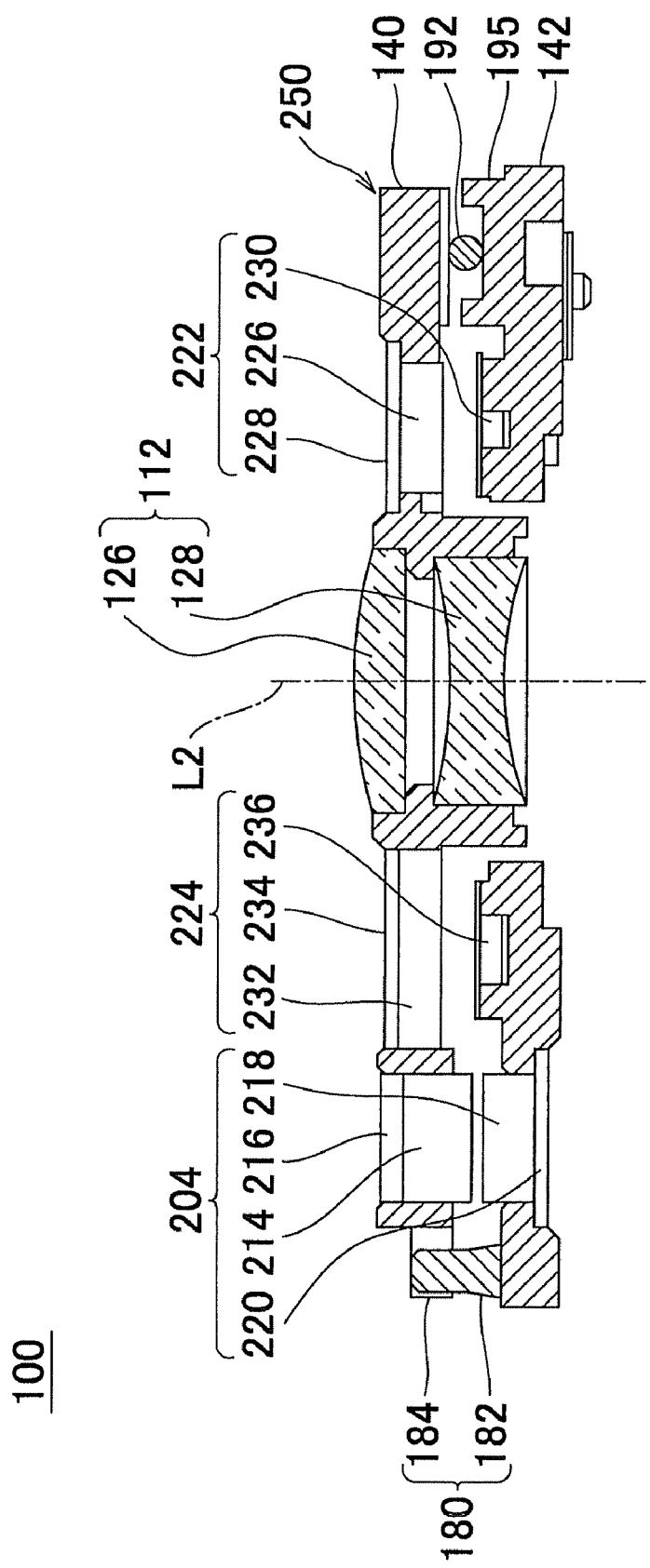
FIG. 8 is a cross-sectional view taken along the line 8-8 of FIG. 7.
Figure 9:
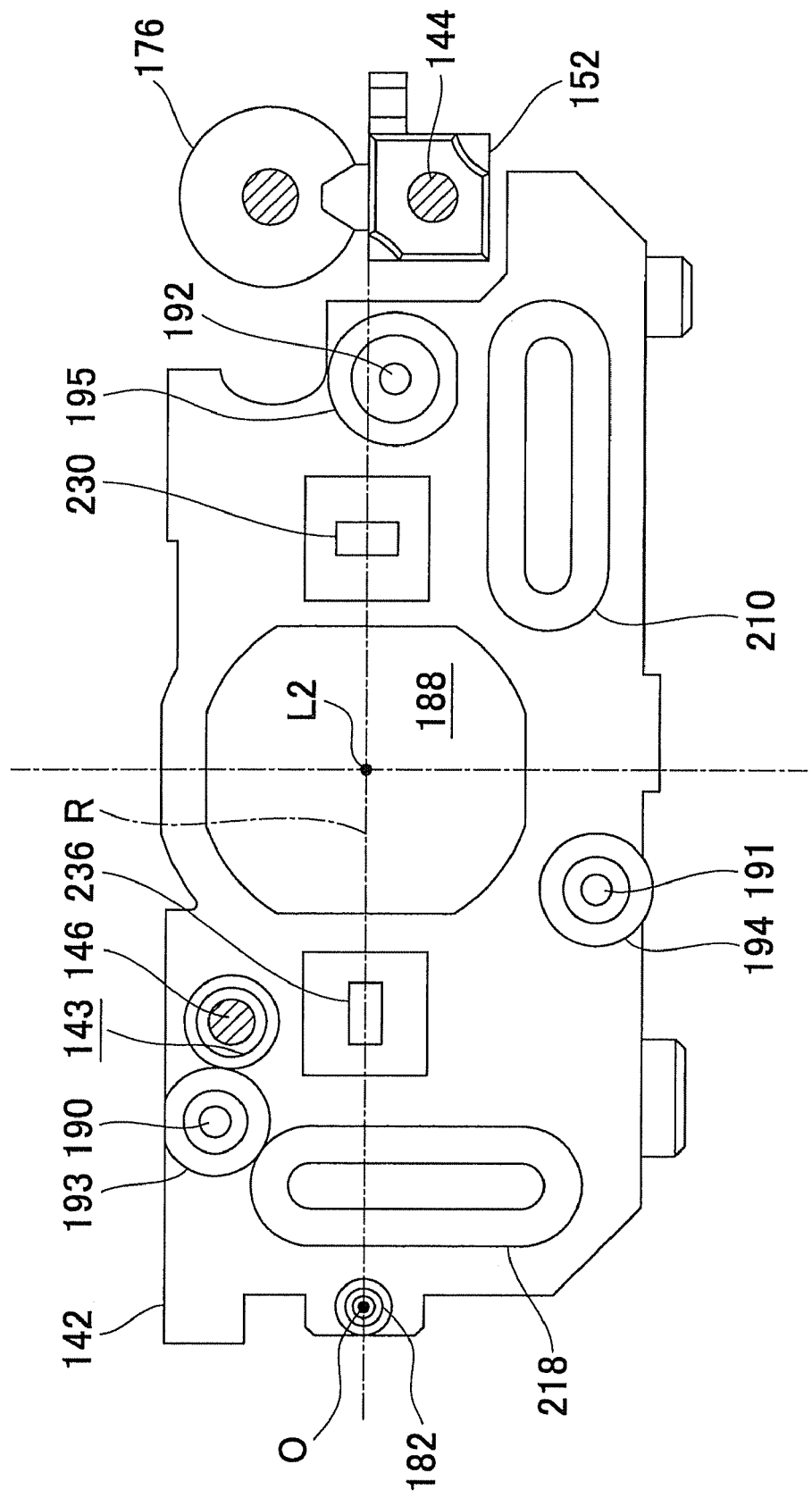
FIG. 9 is a planar view of the support frame 142.

FIG. 7 is a planar view of the vibration-proof lens unit 100. FIG. 8 is a cross-sectional view taken along the line 8-8 of FIG. 7. FIG. 9 is a planar view of the support frame 142. As shown in FIGS. 7 to 9, the vibration-proof lens unit 100 includes the support frame 142, which is fixed to the cylinder 105, and the lens holding frame 140, which is placed on top of the support frame 142. The lens holding frame 140 and the support frame 142 are rectangular boards with crosswise lengths, and are arranged within the cylinder 105.

The vibration-proof lens unit 100 includes the engaging section 180 that joins the lens holding frame 140 to the support frame 142. The engaging section 180 includes a rotation axle 182 positioned on the left end of the support frame 142 and facing upward, and a bearing 184 that is positioned on the left end of the lens holding frame 140 to engage with the rotation axle 182.

A leading end of the rotation axle 182 is faulted as a cylinder, and a long hole 183 is formed in the bearing 184 to engage with the leading tip of the rotation axle 182. The long hole 183 has a length oriented in a radial direction of the rotation axle 182, i.e. a direction of the arrow X in FIG. 7. Therefore, the bearing 184 can rotate and slide relative to the rotation axle 182 in a circumferential direction, i.e. a direction of the arrow θ in FIG. 7, and can advance by sliding in a radial direction.

A lens chamber 186, in which the vibration-proof lenses 126 and 128 are arranged, is formed in the longitudinal center of the lens holding frame 140. The through-hole 141 is formed in the lens holding frame 140 between the lens chamber 186 and the bearing 184, and the guide bar 146 is inserted into the through-hole 141. A circular hole 188 is formed facing the lens chamber 186 in the longitudinal center of the support frame 142. The through-hole 143 is formed in the support frame 142 between the circular hole 188 and the rotation axle 182, and the guide bar 146 is inserted into the through-hole 143.

Three spheres 190, 191, and 192 are formed between the lens holding frame 140 and the support frame 142, and the lens holding frame 140 is supported by the support frame 142 via the spheres 190, 191, and 192. Sphere holders 193, 194, and 195, which respectively hold the spheres 190, 191, and 192, are formed on top of the support frame 142. The sphere holders 193, 194, and 195 have circular walls that surround the spheres 190, 191, and 192 such that the spheres 190, 191, and 192 can roll within the sphere holders 193, 194, and 195.

Here, the spheres 190 and 191 are further inward than the optical axis L2 in a direction of the rotational radius of the lens holding frame 140, and the sphere 192 is further outward than the optical axis L2 in a direction of the rotational radius of the lens holding frame 140. The sphere 190 is arranged further to one side in the rotational direction of the lens holding frame 140 than the optical axis L2, and the sphere 191 is arranged further to another side in the rotational direction of the lens holding frame 140 than the optical axis L2.

In other words, the three spheres 190, 191, and 192 are arranged in a manner to surround the optical axis L2, and the lens holding frame 140 is supported by the support frame 142 in a manner to be moveable within a plane orthogonal to the optical axis L2. Here, when the lens holding frame 140 moves in the plane orthogonal to the optical axis L2, the spheres 190, 191, and 192 roll. Therefore, the friction between the bottom surface of the lens holding frame 140 and the spheres 190, 191, and 192 and between the top surface of the support frame 142 and the spheres 190, 191, and 192 decreases.

The wall of the sphere holder 195, which is the sphere holder arranged farthest outward in the direction of the rotational radius, has the largest diameter, and the wall of the sphere holder 193, which is the sphere holder arranged farthest inward in the direction of the rotational radius, has the smallest diameter. In other words, the sphere 192, which is the sphere arranged farthest outward in the direction of the rotational radius, has the greatest range of rolling in the rotational direction and the direction of the rotational radius, and the sphere 190, which is the sphere arranged farthest inward in the direction of the rotational radius, has the smallest range of rolling in the rotational direction and the direction of the rotational radius.

The vibration-proof lens unit 100 includes a rotational driving unit 202 that moves the lens holding frame 140 in the rotational direction, indicated by the arrow θ in FIG. 7, and a linear driving unit 204 that moves the lens holding frame 140 in a direction of the rotational radius, indicated by the arrow X in FIG. 7. The rotational driving unit 202 is a voice coil motor serving as an electromagnetic motor, and includes a magnet 206 and a yoke arranged on the lens holding frame 140 and a coil 210 and a yoke arranged on the support frame 142. The linear driving unit 204 is a voice coil motor serving as an electromagnetic motor, and includes a magnet 214 and a yoke 216 arranged on the lens holding frame 140 and a coil 218 and a yoke 220 arranged on the support frame 142.

The vibration-proof lens unit 100 includes a rotational position detecting unit 222 that detects a position of the lens holding frame 140 in a direction of the arrow θ in FIG. 7, and a linear position detecting unit 224 that detects a position of the lens holding frame 140 in a direction of the arrow X in FIG. 7. The rotational position detecting unit 222 includes a magnet 226 and a yoke 228 arranged on the lens holding frame 140 and a hall element 230 arranged on the support frame 142. The linear position detecting unit 224 includes a magnet 232 and a yoke 234 arranged on the lens holding frame 140 and a hall element 236 arranged on the support frame 142.

The center of the lens chamber 186, i.e. the optical axis L2, and the center of the rotation axle 182, i.e. the rotational center O of the lens holding frame 140, are arranged on the same line along the direction of the rotational radius. The spheres 190 and 191 are arranged on opposite sides of a line R passing through the rotational center O of the lens holding frame 140 and the optical axis L2.

The rotational driving unit 202 is arranged further outward than the optical axis L2 in the direction of the rotational radius, and the linear driving unit 204 is arranged further inward than the optical axis L2 in the direction of the rotational radius. The rotational driving unit 202 is arranged on one side of the line R in the rotational direction, and the linear driving unit 204 is arranged to span the line R in the rotational direction.

The magnet 206 and the coil 210 provided to the rotational driving unit 202 are both arranged with their lengths in the direction of the rotational radius, and face each other in a direction parallel to the optical axis L2. The magnet 206 and the yoke of the rotational driving unit 202 create a magnetic path that magnetically attracts (i) the magnet 206 and the yoke arranged on the lens holding frame 140 to (ii) the yoke arranged on the support frame 142.

The magnet 214 and the coil 218 provided to the linear driving unit 204 are both arranged with their lengths in the direction orthogonal to the direction of the rotational radius and the optical axis L2, and face each other in a direction parallel to the optical axis L2. The magnet 214 and the yokes 216 and 220 provided to the linear driving unit 204 create a magnetic path that magnetically attracts (i) the magnet 214 and the yoke 216 arranged on the lens holding frame 140 to (ii) the yoke 220 arranged on the support frame 142.

When current flows in the coil 210 in a clockwise direction in FIG. 7, for example, the rotational driving unit 202 generates a force in one direction that is orthogonal to the optical axis L2 and the direction of the rotational radius, e.g. upward in FIG. 7. As a result, the lens holding frame 140 and the vibration-proof lenses 126 and 128 rotate on the rotational center O in one rotational direction, e.g. counter-clockwise in FIG. 7, to correct image vibration caused by shaking of the lens barrel 104 downward in FIG. 7. On the other hand, when current flows in the coil 210 in a counter-clockwise direction in FIG. 7, for example, the rotational driving unit 202 generates a force in the other direction that is orthogonal to the optical axis L2 and the direction of the rotational radius, e.g. downward in FIG. 7. As a result, the lens holding frame 140 and the vibration-proof lenses 126 and 128 rotate on the rotational center O in the other rotational direction, e.g. clockwise in FIG. 7, to correct image vibration caused by shaking of the lens barrel 104 upward in FIG. 7.

When current flows in the coil 210 in a clockwise direction in FIG. 7, for example, the linear driving unit 204 generates a force outward in the direction of the rotational radius. As a result, the lens holding frame 140 moves outward in the direction of the rotational radius to correct image vibration caused by shaking of the lens barrel 104 to the left in FIG. 7. On the other hand, when current flows in the coil 210 in a counter-clockwise direction in FIG. 7, for example, the linear driving unit 204 generates a force inward in the direction of the rotational radius. As a result, the lens holding frame 140 and the vibration-proof lenses 126 and 128 move inward in the direction of the rotational radius to correct image vibration caused by shaking of the lens barrel 104 to the right in FIG. 7.

The rotational position detecting unit 222 is arranged farther outward than the optical axis L2 in the direction of the rotational radius, and the linear position detecting unit 224 is arranged farther inward than the optical axis L2 in the direction of the rotational radius. The hall element 230 of the rotational position detecting unit 222 and the hall element 236 of the linear position detecting unit 224 are arranged in line with the rotational center O and the optical axis L2 in the direction of the rotational radius. The magnet 226 of the rotational position detecting unit 222 and the magnet 232 of the linear position detecting unit 224 are arranged in line with the rotational center O in the direction of the rotational radius.

The center of mass of the movable part 250 is G, and the movable part 250 includes the lens holding frame 140, the vibration-proof lenses 126 and 128, the magnets 206, 214, 226, and 232, and the yokes 216, 228, and 234, all of which are arranged near the optical axis L2. Specifically, the center of mass G is within the lens chamber 186, and is positioned further inward than the optical axis L2 in the direction of the rotational radius and lower than the line R in FIG. 7. The line 1, which connects the centers P1 and P2 of the spheres 190 and 191 arranged further inward than the optical axis L2 in the direction of the rotational radius, is positioned further inward than the center of mass G in the direction of the rotational radius, and the sphere 192 is arranged further outward than the center of mass G in the direction of the rotational radius.

The center M1 of the magnet 206 of the rotational driving unit 202 is arranged further outward than the line 1, the center of mass G, and the optical axis L2 in the direction of the rotational radius, and the center M2 of the magnet 214 of the linear driving unit 204 is arranged further inward than the line 1 and the center of mass G in the direction of the rotational radius. In other words, the center M1 of the magnet 206 and the center M2 of the magnet 214 are arranged on opposite sides of the line 1. The center M2 of the magnet 214 is arranged to sandwich the line 1 with the center of mass G and the optical axis L2, and the center M1 of the magnet 206 is arranged to sandwich the center of mass G and the optical axis L2 with the line 1.

The line 2, which connects the centers P2 and P3 of the spheres 191 and 192, passes between the center of mass G and the center M1 of the magnet 206. In other words, the center M1 of the magnet 206 and the center M2 of the magnet 214 are positioned on opposite sides of the line 2. The center M1 of the magnet 206 sandwiches the line 2 with the center of mass G and the optical axis L2.

The center of mass G, the optical axis L2, the center M1 of the magnet 206, and the center M2 of the magnet 214 are all arranged on one side of the line 3, which connects the centers P3 and P1 of the spheres 192 and 191, in the rotational direction.

Figure 10:
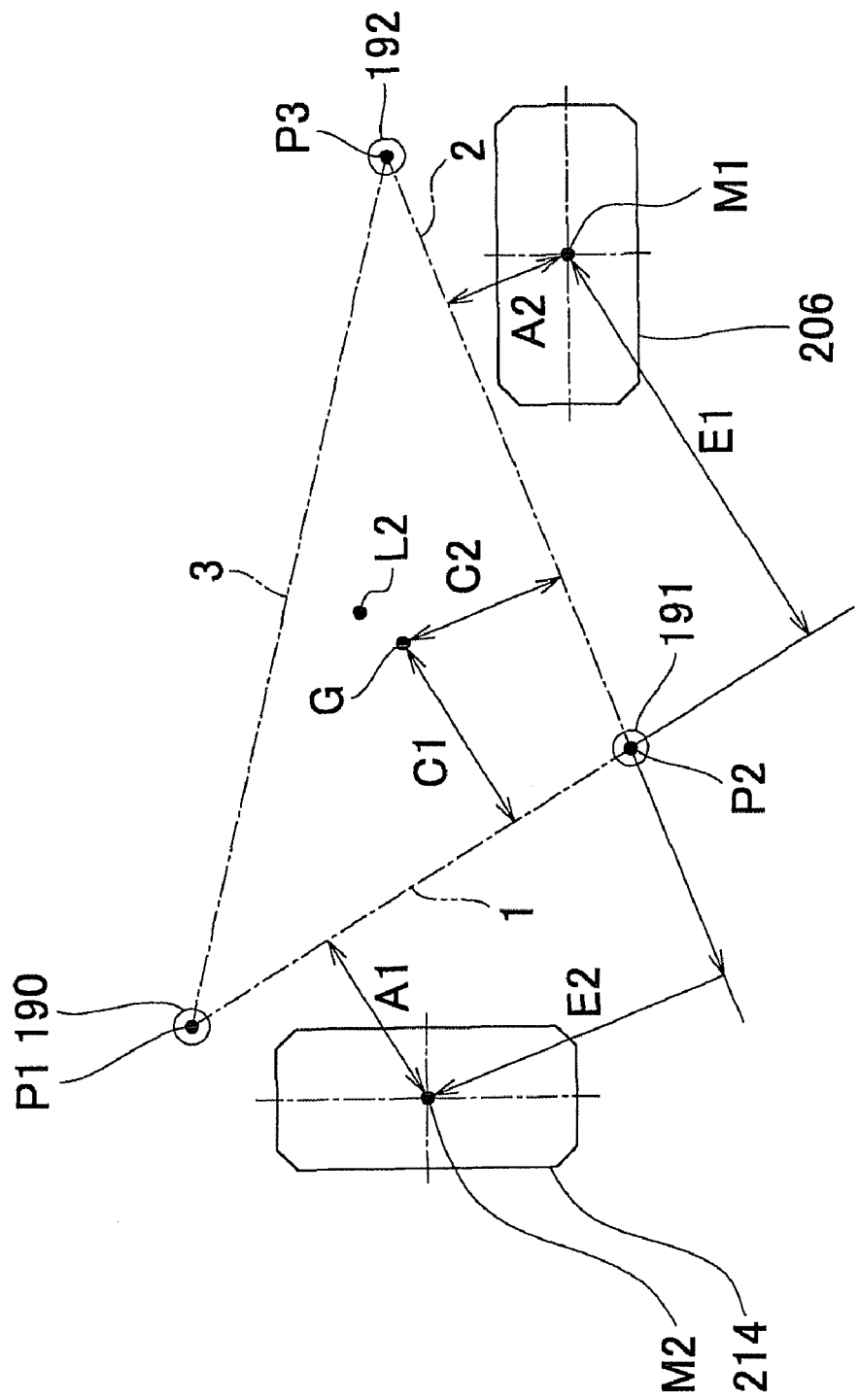
FIG. 10 shows the positional relationship between the center of mass G, the lines 1, 2, and 3, and the centers M1 and M2 of the magnets 206 and 214.

FIG. 10 shows the positional relationship between the center of mass G, the lines 1, 2, and 3, and the centers M1 and M2 of the magnets 206 and 214. As shown in FIG. 10, the distance between the center M2 of the magnet 214 and the line 1 is A1, the distance between the center of mass G and the line 1 is C1, and the distance between the center M1 of the magnet 206 and the line 1 is E1. The distance between the center M1 of the magnet 206 and the line 2 is A2, the distance between the center of mass G and the line 2 is C2, and the distance between the center M2 of the magnet 214 and the line 2 is E2. The magnetic attraction between the yoke 220 and the magnet 214 is B, the magnetic attraction between the magnet 206 and the yoke on the support frame 142 side is F, and the and the weight of the movable part 250 is D.

Here, the distance A1, the magnetic force B, the distance C1, the weight D, the distance E1, and the magnetic force F satisfy Expression 1 below. In other words, the movable part 250 is divided by the line 1 into two regions, where one region includes the optical axis L2 and the center of mass G and the other region does not include the optical axis L2 or the center of mass G. The total momentum of the one region relative to the line 1 is greater than the total momentum of the other region relative to the line 1.

$$A1 \times B < C1 \times D + E1 \times F \qquad \text{Expression 1}$$

The distance A2, the magnetic force F, the distance C2, the weight D, the distance E2, and the magnetic force B satisfy Expression 2 below. In other words, the movable part 250 is divided by the line 2 into two regions, where one region includes the optical axis L2 and the center of mass G and the other region does not include the optical axis L2 or the center of mass G. The total momentum of the one region relative to the line 2 is greater than the total momentum of the other region relative to the line 2.

$$A2 \times F < C2 \times D + E2 \times B \quad \text{Expression 1}$$

In the digital camera 200 of the present embodiment, the case 102 is fowled to be thin from front to back, and therefore the lens barrel 104 housed in the case 102 has a strict space limitation in the direction of thickness of the case 102, i.e. in the front to back direction. Due to such restriction, among other reasons, the cross-section of the lens barrel 104 as seen from the optical axis L2 is a rectangle whose length is oriented crosswise, and the lens holding frame 140 housed in the lens barrel 104 is similarly shaped as a rectangle whose length is oriented crosswise.

Forming the movable part 250 that includes the lens holding frame 140 shaped as such a rectangle to also be moveable in a plane that is orthogonal to the optical axis L2 in both the X direction, i.e. crosswise, and the Y direction, i.e. front to back, which are orthogonal to each other, is considered. However, due to design limitations and the like, there are cases where the center of mass G of the movable part 250 cannot be positioned in the longitudinal center of the lens holding frame 140. In such a case, yawing occurs due to the rotational momentum around the center of mass G when the movable part 250 moves in the Y direction. When yawing of the movable part 250 occurs, the accuracy of controlling the position of the movable part 250 drops, and so it is necessary to add components such as a balancer and a rotation stopping component to restrict the yawing of the movable part 250.

With the present embodiment, however, the movable part 250 rotates on an axis in the X direction and on a rotational axis that is parallel to the optical axis L2. In other words, the movable part 250 rotates with one longitudinal end thereof at a fixed position in the Y direction serving as the rotational center. As a result, without providing additional components such as a balancer and a rotation stopping component, the yawing of the movable part 250 can be restricted to increase the accuracy of positional control of the movable part 250.

In the present embodiment, the lens holding frame 140 is engage with the support frame 142 via the engaging section 180 to be moveable in a rotational direction around the rotational center O and in a direction of the rotational radius along the line R connecting the rotational center O and the optical axis L2. As a result, the frame rotating on the rotational center O and the frame moving in the direction of the rotational radius can be the same. Accordingly, when compared to using individual frames, using the same frame prevents increased size of the vibration-proof lens unit 100 in the direction of the optical axis L2 and eases the design restrictions of the lens barrel 104.

In the present embodiment, the rotation axle 182 arranged on the support frame 142 parallel to the optical axis L2 is slidably engaged in the long hole 183 formed in the lens holding frame 140 whose length corresponds to the radial direction of the rotation axle 182. As a result, the lens holding frame 140 is supported by the support frame 142 in a manner to be rotatable on an axis parallel to the optical axis L2 and to be movable in a direction of the rotational radius of the rotation on this parallel axis.

In the present embodiment, (i) the magnet 206 and the yoke arranged on the lens holding frame 140 face, in a direction parallel to the optical axis L2, (ii) the yoke arranged on the support frame 142, and an attractive magnetic force occurs therebetween. Furthermore, (iii) the magnet 214 and the yoke 216 arranged on the lens holding frame 140 face, in a direction parallel to the optical axis L2, (iv) the yoke 220 arranged on the support frame 142, and an attractive magnetic force occurs therebetween.

It should be noted that the center M2 of the magnet 214 and the center M1 of the magnet 206 are arranged to be on opposite sides of the line 1 that connects the two spheres 190 and 191 from among the three spheres 190, 191, and 192. The center M2 of the magnet 214 is on an opposite side of the line 1 from the center of mass G and the optical axis L2.

Here, the movable part 250 is divided by the line 1 into two regions, where one region includes the optical axis L2 and the center of mass G and the other region does not include the optical axis L2 or the center of mass G. The total momentum of the one region relative to the line 1 is greater than the total momentum of the other region relative to the line 1. Therefore, the direction of the total momentum of the movable part 250 relative to the line 1 is such that the one region draws near the support frame 142 while the other region moves away from the support frame 142. Accordingly, the one region of the movable part 250 is prevented from rising off the sphere 192.

In the present embodiment, the center M2 of the magnet 214 and the center M1 of the magnet 206 are arranged to be on opposite sides of the line 2 that connects the two spheres 191 and 192 from among the three spheres 190, 191, and 192. The center M1 of the magnet 206 is on the opposite side of the line 2 from the center of mass G and the optical axis L2.

Here, the movable part 250 is divided by the line 2 into two regions, where one region includes the optical axis L2 and the center of mass G and the other region does not include the optical axis L2 or the center of mass G. The total momentum of the one region relative to the line 2 is greater than the total momentum of the other region relative to the line 2. Therefore, the direction of the total momentum of the movable part 250 relative to the line 2 is such that the one region draws near the support frame 142 while the other region moves away from the support frame 142. Accordingly, the one region of the movable part 250 is prevented from rising off the sphere 190.

In the present embodiment, the movable part 250 is supported on the support frame 142 via the three spheres 190, 191, and 192 arranged to surround the optical axis L2, and therefore the degree of parallelization between the movable part 250 and the support frame 142 increases. Accordingly, the inclination of the vibration-proof lenses 126 and 128 relative to the optical axis L2 can be controlled without providing a biasing member such as a spring for biasing the movable part 250 toward the support frame 142, a balancer for adjusting the center of mass of the movable part 250, or the like.

In the present invention, the sphere 192, which is arranged farthest outward in the direction of the rotational radius from among the three spheres 190, 191, and 192, has the greatest range of movement in the rotational direction, and the sphere 190, which is arranged farthest inward in the direction of the rotational radius from among the three spheres 190, 191, and 192, has the smallest range of movement in the rotational direction. In other words, since the amount of movement of the movable part 250 in the rotational direction increases farther outward in the direction of the rotational radius, the range of mobility in the rotational direction of the spheres 190, 191, and 192 also increases as the distance from the rotational center O increases. As a result, the range of mobility of the movable part 250 in the rotational direction can be ensured, and the space created to allow for mobility of the spheres 190 and 191 in the direction of the rotational radius can be lessened to decrease the space occupied by the sphere holder 193 and 194 in the support frame 142. Accordingly, the expansion of the support frame 142 in a direction orthogonal to the optical axis L2 is prevented, as is the expansion of the lens barrel 104 in a direction orthogonal to the optical axis L2.

It should be noted that the magnet 232 of the linear position detecting unit 224 and the magnet 226 of the rotational position detecting unit 222 are arranged at different positions in the X direction, which is different from the direction of the optical axis L2. Therefore, when controlling the positions of the vibration-proof lenses 126 and 128, it is necessary to correct the detection result of the hall element 230 of the rotational position detecting unit 222 and the hall element 236 of the linear position detecting unit 224 according to the positional difference between (i) the magnet 232 and the magnet 226 and (ii) the optical axis L2.

In the present embodiment, the linear position detecting unit 224 and the rotational position detecting unit 222 are arranged in line with the rotational center O and the optical axis L2 in the direction of the rotational radius, and so the magnets 232 and 226 rotate with the optical axis L2 around the rotational center O. Therefore, the rotational velocity of the magnets 232 and 226 is equal to that of the optical axis L2 and there is a proportional relationship between the amount of movement of these elements in the rotational direction and the amount of movement in the direction of the rotational radius, and so the detection results of the hall elements 236 and 230 can be corrected easily. Accordingly, the feedback control for the positions of the vibration-proof lenses 126 and 128 can be simplified and quickened, thereby increasing the tracking ability for hand vibration of the vibration-proof lenses 126 and 128.

In the present embodiment, the linear driving unit 204 is arranged further inward than the center of mass G of the movable part 250 in a direction of the rotational radius, and the rotational driving unit 202 is arranged further outward than the center of mass G of the movable part 250 in a direction of the rotational radius. As a result, compared to arranging the rotational driving unit 202 further inward than the center of mass G in the direction of the rotational radius, the above arrangement lengthens the moment arm of the drive force generated by the rotational driving unit 202 relative to the rotational center O, thereby efficiently increasing the drive momentum generated by the rotational driving unit 202.

While the embodiment of the present invention has been described, the technical scope of the invention is not limited to the above described embodiment. It is apparent to persons skilled in the art that various alterations and improvements can be added to the above-described embodiment. It is also apparent from the scope of the claims that the embodiments added with such alterations or improvements can be included in the technical scope of the invention.

For example, in the present embodiment, the rotation axle 182 is provided on the support frame 142 and the bearing 184 is provided on the lens holding frame 140. Instead, the rotation axle 182 may be provided on the lens holding frame 140 and the bearing 184 may be provided on the support frame 142. In the present embodiment, the rotational drive and linear drive magnets 206 and 214 are provided on the lens holding frame 140, and the rotational drive and linear drive coils 210 and 218 are provided on the support frame 142. Instead, the magnets 206 and 214 may be provided on the support frame 142 and the coils 210 and 218 may be provided on the lens holding frame 140.

In the present embodiment, rotational position and linear position detection magnets 226 and 232 are provided. Instead, the positions of the rotational drive and linear drive magnets 206 and 214 may be detected by the hall elements 230 and 236. In the present embodiment, the lens holding frame 140 is supported by the support frame 142 via the rolling spheres 190, 191, and 192. In place of the spheres 190, 191, and 192, protrusions fixed to the support frame 142 or to the lens holding frame 140 may be used.

The operations, procedures, steps, and stages of each process performed by an apparatus, system, program, and method shown in the claims, embodiments, or diagrams can be performed in any order as long as the order is not indicated by "prior to", "before", or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A vibration-proof lens unit comprising:
a lens holder that holds a vibration-proof lens;
a support that supports the lens holder in a manner to be movable within a plane orthogonal to an optical axis of the vibration-proof lens;
an engaging section that engages the lens holder with the support such that the lens holder can move (i) in a rotational direction around an axis line parallel to the optical axis of the vibration-proof lens and (ii) in a direction of a rotational radius orthogonal to the axis line;
a rotational driving unit that moves the lens holder in the rotational direction;
a linear driving unit that moves the lens holder in the direction of the rotational radius, and
three support points that are arranged to surround the optical axis of the vibration-proof lens and a center of mass of a movable part that includes the lens holder and moves integrally with the lens holder, and that support the lens holder on the support, wherein
the rotational driving unit and the linear driving unit are voice coil motors that each include (i) a magnet provided on one of the lens holder and the support and (ii) a coil and a yoke provided on the other of the lens holder and the support to face the magnet,
the rotational driving unit and the linear driving unit are provided on opposite sides of a line connecting two of the three support points, one of the rotational driving unit and the linear driving unit being provided on the opposite side of the line from the center of mass and the optical axis of the vibration-proof lens,
(i) a distance A between the line and a center of the magnet provided to said one of the rotational driving unit and the linear driving unit, (ii) magnetic attraction B of the magnet of said one of the rotational driving unit and the linear driving unit, (iii) a distance C between the center of mass and the line, (iv) weight D of the movable part, (v) a distance E between the line and a center of the magnet provided to the other of the rotational driving unit and the linear driving unit, and (vi) magnetic attraction F of the magnet of the other of the rotational driving unit and the linear driving unit satisfy Expression 1, and Expression 1 is defined as: $A \times B < C \times D + E \times F$.

2. The vibration-proof lens unit according to claim 1, wherein the engaging section includes:
a rotation axle that is provided on one of the support and the lens holder, and that extends along the axis line; and a bearing that is provided on the other of the support and the lens holder, and into which the rotation axle can be slidably engaged in the rotational direction and the direction of the rotational radius.

3. The vibration-proof lens unit according to claim 1, comprising a plurality of spheres that are arranged between the lens holder and the support to be rollable in the rotational direction and the direction of the rotational radius, and that support the lens holder on the support, wherein movement range of the plurality of spheres in the rotational direction is wider when a distance from the axis line is greater.

4. The vibration-proof lens unit according to claim 1, comprising a linear position detecting unit that is provided in line with the axis line in the direction of the rotational radius, and that detects a position of the lens holder in the direction of the rotational radius.

5. The vibration-proof lens unit according to claim 1, comprising a rotational position detecting unit that is provided in line with the axis line in the direction of the rotational radius, and that detects a position of the lens holder in the rotational direction.

6. The vibration-proof lens unit according to claim 1, comprising:

three spheres that are arranged between the lens holder and the support to surround the optical axis of the vibration-proof lens and a center of mass of a movable part that includes the lens holder and moves integrally with the lens holder, the spheres being rollable in the rotational direction and the direction of the rotational radius and supporting the lens holder on the support;

a linear position detecting unit that is provided in line with the axis line in the direction of the rotational radius, and that detects a position of the lens holder in the direction of the rotational radius; and a rotational position detecting unit that is provided in line with the axis line in the direction of the rotational radius, and that detects a position of the lens holder in the rotational direction, wherein the linear driving unit is provided further inward than the center of mass in the direction of the rotational radius, and the rotational driving unit is provided further outward than the center of mass in the direction of the rotational radius.

7. An image capturing apparatus, comprising:

the vibration-proof lens unit according to claim 1; and an image capturing optical system that includes the vibration-proof lens.

8. The image capturing apparatus according to claim 7, wherein the image capturing optical system includes a deflecting section that deflects an optical axis of the image capturing optical system at a right angle.

9. A vibration-proof lens unit comprising:

a lens holder that holds a vibration-proof lens;

a support that supports the lens holder in a manner to be movable within a plane orthogonal to an optical axis of the vibration-proof lens;

an engaging section that engages the lens holder with the support such that the lens holder can move (i) in a rotational direction around an axis line parallel to the optical axis of the vibration-proof lens and (ii) in a direction of a rotational radius orthogonal to the axis line;

a rotational driving unit that moves the lens holder in the rotational direction;

a linear driving unit that moves the lens holder in the direction of the rotational radius, and first, second, and third support points that are arranged to surround the optical axis of the vibration-proof lens and a center of mass of a movable part that includes the lens holder and moves integrally with the lens holder, and that support the lens holder on the support, wherein the rotational driving unit and the linear driving unit are voice coil motors that each include (i) a magnet provided on one of the lens holder and the support and (ii) a coil and a yoke provided on the other of the lens holder and the support to face the magnet, the rotational driving unit and the linear driving unit are provided on opposite sides of a first line connecting the first support point and the second support point, and are provided on opposite sides of a second line that connects the second support point and the third support point, the rotational driving unit is provided on the opposite side of the first line from the center of mass and the optical axis of the vibration-proof lens, the linear driving unit is provided on the opposite side of the second line from the center of mass and the optical axis of the vibration-proof lens, (i) a distance $A1$ between the first line and a center of the magnet provided to the rotational driving unit, (ii) magnetic attraction $B$ of the magnet of the rotational driving unit, (iii) a distance $C1$ between the center of mass and the first line, (iv) weight $D$ of the movable part, (v) a distance $E1$ between the first line and a center of the magnet provided to the linear driving unit, and (vi) magnetic attraction $F$ of the magnet of the linear driving unit satisfy Expression 2, Expression 2 is defined as: $A1 \times B < C1 \times D + E1 \times F$, (vii) a distance $A2$ between the second line and the center of the magnet provided to the linear driving unit, (viii) the magnetic attraction $F$ of the magnet of the linear driving unit, (ix) a distance $C2$ between the center of mass and the second line, (x) the weight $D$ of the movable part, (xi) a distance $E2$ between the second line and the center of the magnet provided to the rotational driving unit, and (xii) the magnetic attraction $B$ of the magnet of the rotational driving unit satisfy Expression 3, and Expression 3 is defined as: $A2 \times F < C2 \times D + E2 \times B$.

* * * * *